US010175760B2

(12) United States Patent
Cruz-Hernandez et al.

(10) Patent No.: US 10,175,760 B2
(45) Date of Patent: *Jan. 8, 2019

(54) HIGH DEFINITION HAPTIC EFFECTS GENERATION USING PRIMITIVES

(71) Applicant: Immersion Corporation, San Jose, CA (US)

(72) Inventors: Juan Manuel Cruz-Hernandez, Montreal (CA); Liwen Wu, Verdun (CA); Christopher J. Ullrich, Ventura, CA (US)

(73) Assignee: Immersion Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/337,404

(22) Filed: Oct. 28, 2016

(65) Prior Publication Data

US 2017/0045944 A1   Feb. 16, 2017

Related U.S. Application Data

(63) Continuation of application No. 13/767,129, filed on Feb. 14, 2013.

(60) Provisional application No. 61/599,173, filed on Feb. 15, 2012.

(51) Int. Cl.
*G06F 3/01* (2006.01)
*G06F 3/041* (2006.01)

(52) U.S. Cl.
CPC .............. *G06F 3/016* (2013.01); *G06F 3/041* (2013.01)

(58) Field of Classification Search
CPC .. G06F 3/016; G06F 3/0414; G06F 2203/014; G06F 3/16; G06F 2203/013; G06F 3/04883; G06F 3/041; G09G 5/00
See application file for complete search history.

(56) References Cited

U.S. PATENT DOCUMENTS

| 8,279,193 | B1 | 10/2012 | Birnbaum et al. |
| 2003/0067440 | A1 | 4/2003 | Rank |
| 2007/0118241 | A1* | 5/2007 | Rosenberg ............. G10H 1/053 700/94 |
| 2008/0062145 | A1* | 3/2008 | Shahoian ............... G06F 1/1616 345/173 |

(Continued)

FOREIGN PATENT DOCUMENTS

| JP | 2008-33739 A | 2/2008 |
| JP | 2011-159110 A1 | 8/2011 |

(Continued)

OTHER PUBLICATIONS

E. Siegel; "Haptics Technology: Picking up Good Vibrations"; www.eetimes.com/General/PrintView/421832; Jul. 24, 2011.

(Continued)

*Primary Examiner* — Robert J Michaud
(74) *Attorney, Agent, or Firm* — Miles & Stockbridge, P.C.

(57) ABSTRACT

A haptically enabled system receives a haptic effect primitive comprising a plurality of input parameters and receives an input from a sensor. The system generates a haptic effect signal from the haptic effect primitive, the haptic effect signal comprising a plurality of output parameters where at least one of the output parameters is varied based on the sensor input. The system then applies the haptic effect signal to an actuator.

20 Claims, 6 Drawing Sheets

(56) References Cited

U.S. PATENT DOCUMENTS

| | | |
|---|---|---|
| 2010/0156818 A1 | 6/2010 | Burrough |
| 2010/0245237 A1* | 9/2010 | Nakamura .............. A63F 13/02 |
| | | 345/156 |
| 2011/0075835 A1* | 3/2011 | Hill ................... H04M 1/72563 |
| | | 379/418 |
| 2011/0244963 A1 | 10/2011 | Grant |
| 2012/0056838 A1* | 3/2012 | Harris ................... G06F 3/0436 |
| | | 345/173 |
| 2012/0127088 A1* | 5/2012 | Pance ..................... G06F 3/016 |
| | | 345/173 |
| 2012/0229401 A1 | 9/2012 | Birnbaum et al. |
| 2014/0282008 A1* | 9/2014 | Verard .................... G03H 1/00 |
| | | 715/728 |

FOREIGN PATENT DOCUMENTS

| | | |
|---|---|---|
| WO | 0133760 A2 | 5/2001 |
| WO | 0154109 A1 | 7/2001 |
| WO | 2010/112937 A2 | 10/2010 |

OTHER PUBLICATIONS

P. Cook et al.; "Using DSP-Based Parametric Physical Synthesis Models to Study Human Sound Perception"; 2003 IEEE Workshop on Applications of Signal Processing on Audio and Acoustics; Oct. 19-22, 2003; New Paltz, NY.

* cited by examiner

HIGH DEFINITION HAPTIC EFFECTS GENERATION USING PRIMITIVES

CROSS REFERENCE TO RELATED APPLICATIONS

This application is a continuation of U.S. patent application Ser. No. 13/767,129, filed on Feb. 14, 2013, (the disclosure of which is hereby incorporated by reference), where U.S. patent application Ser. No. 13/767,129 claims priority of U.S. Provisional Patent Application Ser. No. 61/599,173, filed on Feb. 15, 2012 (the disclosure of which is hereby incorporated by reference).

FIELD

One embodiment is directed to haptic effects, and in particular to generating high definition haptic effects using primitives.

BACKGROUND INFORMATION

Electronic device manufacturers strive to produce a rich interface for users. Conventional devices use visual and auditory cues to provide feedback to a user. In some interface devices, kinesthetic feedback (such as active and resistive force feedback) and/or tactile feedback (such as vibration, texture, and heat) is also provided to the user, more generally known collectively as "haptic feedback" or "haptic effects". Haptic feedback can provide cues that enhance and simplify the user interface. Specifically, vibration effects, or vibrotactile haptic effects, may be useful in providing cues to users of electronic devices to alert the user to specific events, or provide realistic feedback to create greater sensory immersion within a simulated or virtual environment.

In order to generate vibration effects, many devices utilize some type of actuator or haptic output device. Known actuators used for this purpose include an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric, electroactive polymers or shape memory alloys. Haptic output devices may also be non-mechanical or non-vibratory devices such as devices that use electrostatic friction ("ESF"), ultrasonic surface friction ("USF"), devices that induce acoustic radiation pressure with an ultrasonic haptic transducer, devices that use a haptic substrate and a flexible or deformable surface, devices that provide projected haptic output such as a puff of air using an air jet, etc.

SUMMARY

One embodiment is a haptically enabled system that receives a haptic effect primitive comprising a plurality of input parameters and receives an input from a sensor. The system generates a haptic effect signal from the haptic effect primitive, the haptic effect signal comprising a plurality of output parameters where at least one of the output parameters is varied based on the sensor input. The system then applies the haptic effect signal to an actuator.

DETAILED DESCRIPTION

One embodiment is a haptic effect generation system that generates vibratory-type haptic effects for use with high-definition ("HD") actuators. The haptic effects are expressed in the form of haptic "primitives" in which parameters such as period, duration and amplitude are used to define a haptic effect, and the parameters are then interpreted by an engine and converted into motor voltage signals that include output parameters and that are applied to the HD actuators.

ERM and LRA type actuators can be considered "low-definition" actuators in that they have a limited frequency range when generating haptic effects. In contrast, an HD actuator, such as piezo, electroactive polymer or electrostatic based actuators, can output higher frequency content with a faster ramp-up time and large dynamic range. Therefore, haptic effects generated by HD actuators can be richer and more lifelike than those generated by low-definition actuators. Although haptic effect parameters/primitives that were developed for low-definition actuators can generally be used with HD actuators, they generally do not take advantage of these high-definition properties. Further, HD primitives may include more parameters than low definition primitives, which may only have a single parameter such as amplitude.

Figure 1:
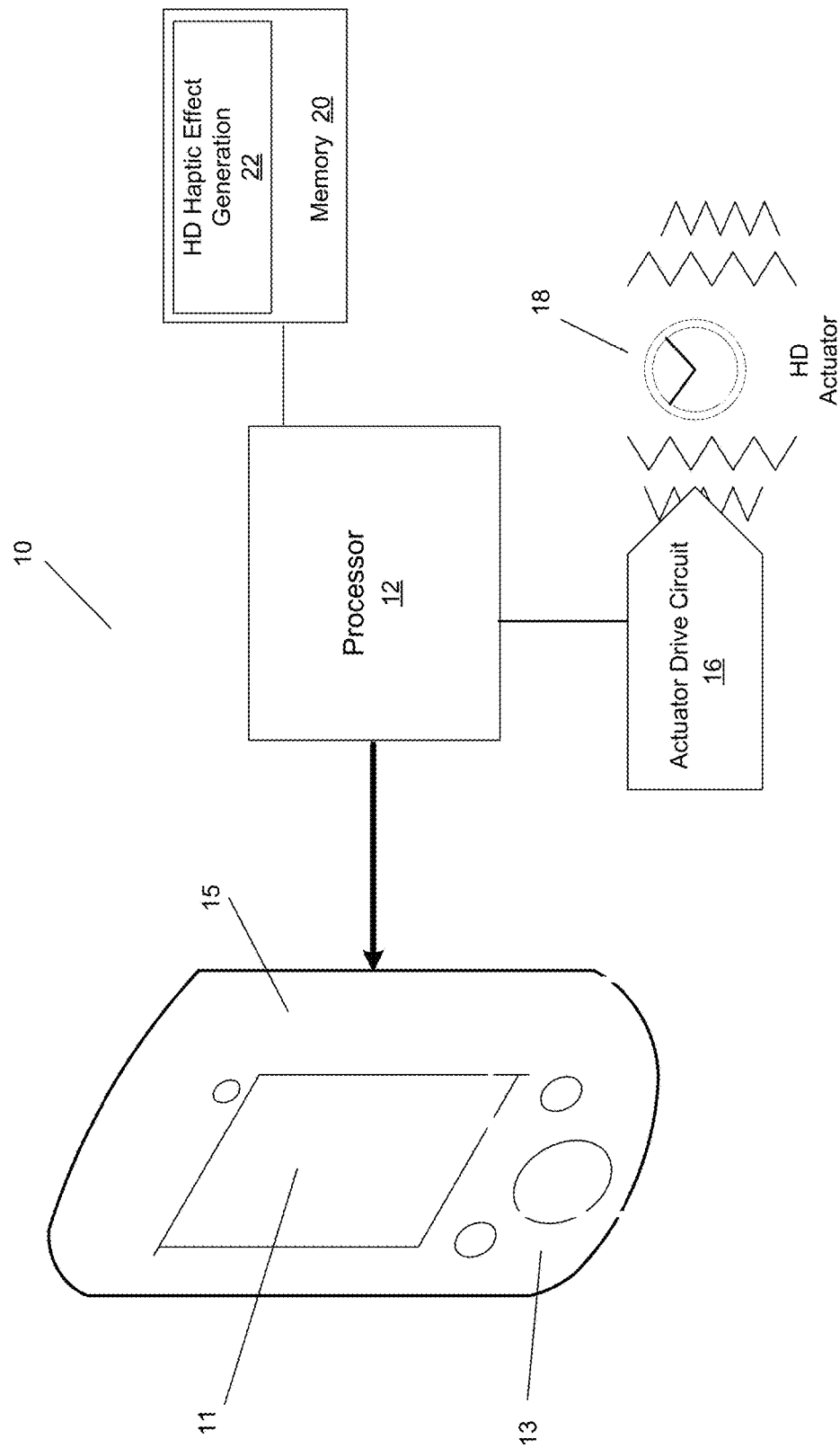
FIG. 1 is a block diagram of a haptically-enabled system in accordance with one embodiment of the present invention.

FIG. 1 is a block diagram of a haptically-enabled system 10 in accordance with one embodiment of the present invention. System 10 includes a touch sensitive surface 11 or other type of user interface mounted within a housing 15, and may include mechanical keys/buttons 13. Internal to system 10 is a haptic feedback system that generates vibrations on system 10. In one embodiment, the vibrations are generated on touch surface 11.

The haptic feedback system includes a processor or controller 12. Coupled to processor 12 is a memory 20 and an actuator drive circuit 16, which is coupled to an HD actuator 18 (e.g., piezo, electo-active polymer, etc.). HD actuator 18 in some embodiments may be a deformable actuator such as a Macro Fiber Composite ("MFC") actuator. Processor 12 may be any type of general purpose processor, or could be a processor specifically designed to provide haptic effects, such as an application-specific integrated circuit ("ASIC"). Processor 12 may be the same processor that operates the entire system 10, or may be a separate processor. Processor 12 can decide what haptic effects are to be played and the order in which the effects are played based on high level parameters. In general, the high level parameters that define a particular haptic effect include magnitude, frequency and duration. Low level parameters such as streaming motor commands could also be used to determine a particular haptic effect. A haptic effect may be considered "dynamic" if it includes some variation of these parameters when the haptic effect is generated or a variation of these parameters based on a user's interaction.

Processor 12 outputs the control signals to actuator drive circuit 16, which includes electronic components and circuitry used to supply HD actuator 18 with the required electrical current and voltage (i.e., "motor signals") to cause the desired haptic effects. System 10 may include more than one HD actuator 18 (or additional types of actuators), and each HD actuator may include a separate drive circuit 16, all coupled to a common processor 12. Memory device 20 can be any type of storage device or computer-readable medium, such as random access memory ("RAM") or read-only memory ("ROM"). Memory 20 stores instructions executed by processor 12, such as operating system instructions. Among the instructions, memory 20 includes an HD haptic effect generation module 22 which are instructions that, when executed by processor 12, generate an HD haptic effect signal (i.e., motor signals that are applied to HD actuator 18 via drive circuit 16) from an HD haptic effect primitive, as disclosed in more detail below. Memory 20 may also be located internal to processor 12, or any combination of internal and external memory.

Touch surface 11 recognizes touches, and may also recognize the position and magnitude of touches on the surface. The data corresponding to the touches is sent to processor 12, or another processor within system 10, and processor 12 interprets the touches and in response generates haptic effect signals. Touch surface 11 may sense touches using any sensing technology, including capacitive sensing, resistive sensing, surface acoustic wave sensing, pressure sensing, optical sensing, etc. Touch surface 11 may sense multi-touch contacts and may be capable of distinguishing multiple touches that occur at the same time. Touch surface 11 may be a touchscreen that generates and displays images for the user to interact with, such as keys, dials, etc., or may be a touchpad with minimal or no images.

System 10 may be a handheld device, such a cellular telephone, personal digital assistant ("PDA"), smartphone, computer tablet, gaming console, etc., or may be any other type of device that provides a user interface and includes a haptic effect system that includes one or more actuators. The user interface may be a touch sensitive surface, or can be any other type of user interface such as a mouse, touchpad, mini-joystick, scroll wheel, trackball, game pads or game controllers, etc. System 10 may also include one or more sensors. In one embodiment, one of the sensors is an accelerometer (not shown) that measures the acceleration of system 10.

A dynamic haptic effect refers to a haptic effect that evolves over time as it responds to one or more input parameters. Dynamic haptic effects are haptic or vibrotactile effects displayed on haptic devices such as system 10 to represent a change in state of a given input signal. The input signal can be a signal captured by sensors on the device with haptic feedback, such as position, acceleration, pressure, orientation, or proximity, or signals captured by other devices and sent to the haptic device to influence the generation of the haptic effect.

A dynamic effect signal can be any type of signal, but does not necessarily have to be complex. For example, a dynamic effect signal may be a simple sine wave that has some property such as phase, frequency, or amplitude that is changing over time or reacting in real time according to a mapping schema which maps an input parameter onto a changing property of the effect signal. An input parameter may be any type of input capable of being provided by a device, and typically may be any type of signal such as a device sensor signal. A device sensor signal may be generated by any means, and typically may be generated by capturing a user gesture with a device. Dynamic effects may be very useful for gesture interfaces, but the use of gestures or sensors are not necessarily required to create a dynamic signal.

Figure 2:
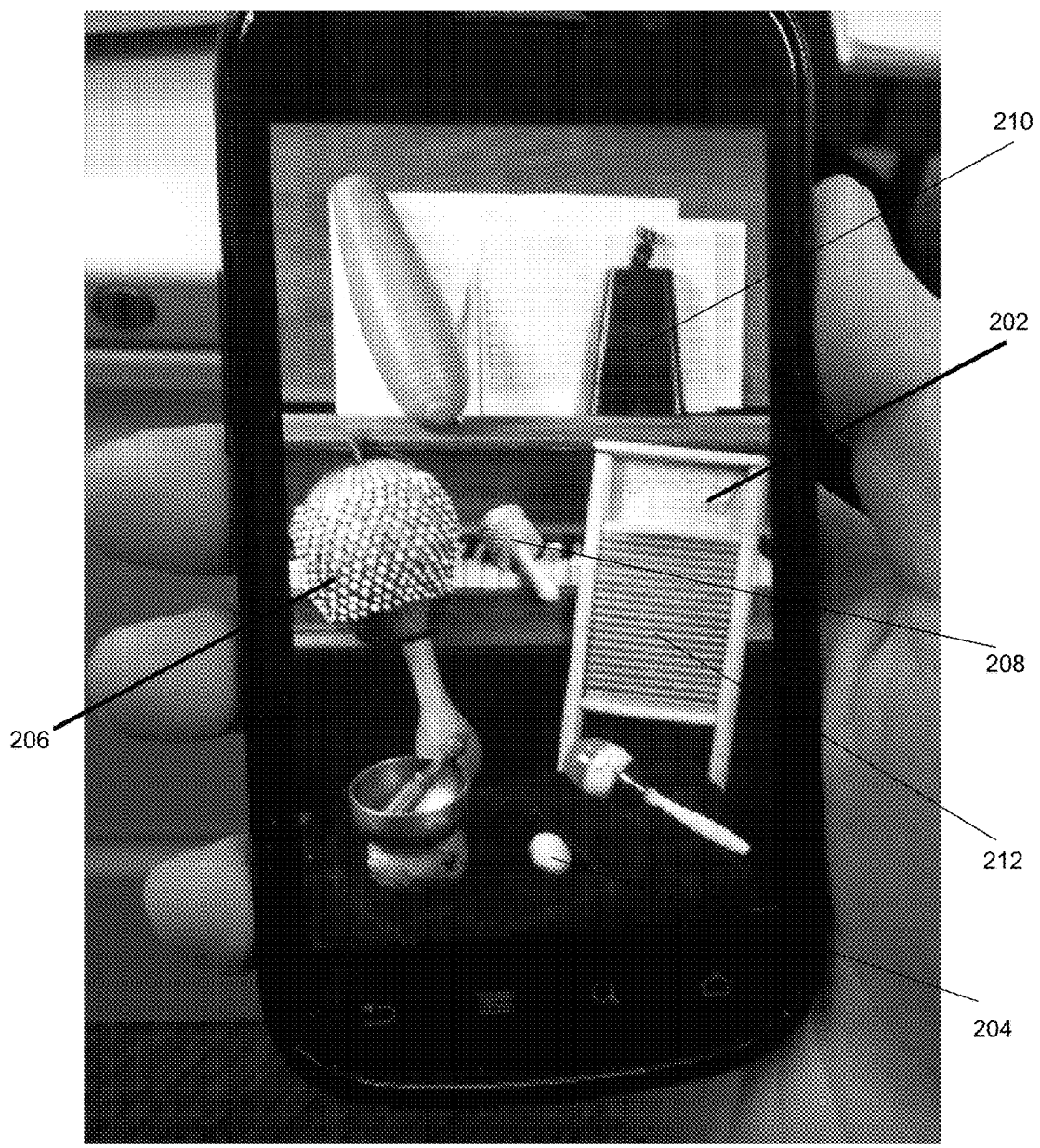
FIG. 2 is a perspective view of system that includes selectable graphical images of musical instruments to be simulated in accordance with one embodiment.

One embodiment uses HD haptic effects to generate realistic mechanical simulations of musical instruments. FIG. 2 is a perspective view of system 10 that includes selectable graphical images of musical instruments to be simulated in accordance with one embodiment. The instruments displayed include a maraca 202, an egg shaker 204, a shekere 206, a cabasa 208, a cow bell 210, and a wash board 212. A user can select one of the instruments and interact with the system 10 as if interacting with the actual instrument. For example, system 10 can be shaken when maraca 202 is selected and HD haptic effects will be generated that provide a realistic feel of shaking a maraca by providing appropriate haptic effect signals to HD actuator 18. Therefore, while the user is shaking a mobile device such as system 10, the user will feel haptic effects as if a real maraca is being shaken, due to the generation of the HD haptic effects that recreate or provide the sensation that maraca "beads" inside the phone are colliding. Likewise, cow bell 210 can be tapped for a sound and its corresponding haptic effect, or the entire device can be moved as if one is moving a cow bell. In response HD haptic effects are generated that will cause the user to feel as if they are moving an actual cow bell, including the sensation of the weight of the bell as the bell knocker moves from side to side.

Frequency Based HD Haptic Effects Generation

Frequency Variation

One embodiment generates haptic effect signals from HD haptic primitives using frequency variation and frequency modulation ("FM"). In one embodiment, the frequency of the generated HD haptic effect signal is varied based on a corresponding input sensor signal, such as an acceleration signal generated by an accelerometer of system 10. In contrast, some prior art low definition haptic effect systems only allow for variation of magnitude over time, while the frequency is kept constant.

In one embodiment, the following equation that is known for the use of generating audio signals can also be used for generating HD haptic effect signals from HD primitives:

$$a_{fm} = a_c \sin(2\pi f_c t + a_m \sin(2\pi f_m t)t) \qquad \text{Equation 1}$$

Where four input HD haptic effect parameters, amplitudes "$a_c$" and "$a_m$" (carrier and modulation amplitude, respectively) and frequencies "fc" and "fm" (carrier and modulation frequency, respectively) are input to module 22 of FIG. 1, and in response the HD haptic effect motor signals "$a_{fm}$" are generated and applied to HD actuator 18. However, Equation 1 is ideally used for audio signals with frequency values above the hundreds of kilohertz range. When used for haptic effects that generally have sub-kilohertz signals, the generated HD haptic effects are not as realistic as typically desired.

Therefore, embodiments vary Equation 1 for HD haptic effects. In one embodiment, the input frequency parameter is varied as a function of an external signal, "$S_{val}$", such as a finger position on touchscreen 11, an acceleration of system 10 as measured by an on-board accelerometer, surface pressure, etc. In this embodiment, the frequency varied output signal "$a_{fv}$" is:

$$a_{fv} = a_c \sin(2\pi f_{var} t) \qquad \text{Equation 2}$$

Where $f_{var} = f_c + S_{val}$ and $S_{val} \in [-f_{min}, +f_{max}]$ and $S_{val}$ is a sensor value at any given time which is mapped to a range of values that will modify the frequency carrier of the signal.

Figure 3:
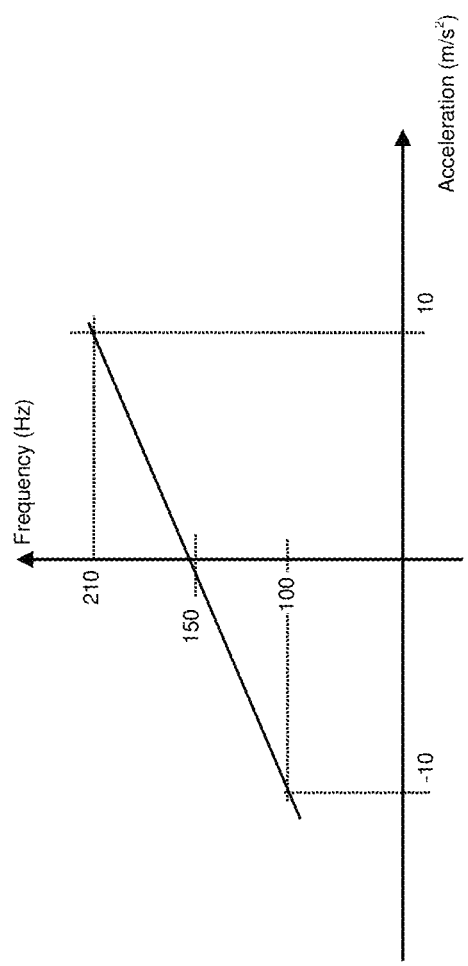
FIG. 3 is a graph of Frequency v. Acceleration that illustrates a linear mapping in accordance with one embodiment.

As shown in Equation 2, the frequency content of the signal can be seen by looking at the value of $f_{var}$, which will vary between $f_c-f_{min}$ and $f_c+f_{max}$. For example, if the frequency needs to vary as a function of acceleration, and the acceleration values are between −10 m/sec² and 10 m/sec² and the values of $S_{val}$Å[−50, 60] and $f_c$=150 Hz, then a function can be used to map acceleration values Acc to frequency values $f_{var}$, and the function can be of any kind. FIG. 3 is a graph of Frequency v. Acceleration that illustrates a linear mapping in accordance with one embodiment. Other mappings can be used in additional embodiments.

In another embodiment, $f_{var}$ in Equation 2 is expressed using a scaling factor as oppose to a range of values, and therefore $f_{var}$ is expressed as follows:

$$f_{var}=f_c*S_{val} \text{ where } S_{val} \in [0, S_{max}] \quad \text{Equation 3}$$

in which the frequency will vary as a function of the scalar $S_{val}$ which has been normalized between 0 and $S_{max}$. If for example the acceleration is scaled to values between 0 and 2.1, and $f_c$=100 Hz, then when the scaled acceleration is at 0, $f_{var}$=100 Hz, and when the scaled acceleration is at 2.1, $f_{var}$=210 Hz. In one embodiment the scaled acceleration is assumed to be mapped between −10 and 10 to values between 0 and 2.1 in a linear fashion, but in other embodiments the scaling can be done using linear, quadratic exponential or other kinds of mappings.

In another embodiment, the magnitude $a_c$ parameter of Equation 2 can be varied as a function of some external signal, and those variations can be done in a similar fashion as it was described for $f_{var}$.

Phase Modulation

One embodiment generates the HD haptic signal using phase modulation, which can be considered an indirect generation of an FM signal. In this embodiment, Equation 1 above is modified to the following:

$$a_{pm} = a_c \sin\left(2\pi f_c t + \frac{a_m}{f_m}\sin(2\pi f_m t)\right) \quad \text{Equation 4}$$

Where the second term is the phase of the signal and depends only on the sine value and not on the product of the sine value and the time as in Equation 1. A haptic effect generated with Equation 4 only varies as a function of time. However, as disclosed above there is a need to have a variation as a function of some other external variable, like a sensor value, or human gesture captured by the sensor. Therefore, in one embodiment the parameters of Equation 4 are modified in a similar fashion as the parameters of Equation 2 above. Modified embodiments include the following:

Vary $f_c$ as a function of the sensor:

$$a_{pm} = a_c \sin\left(2\pi(f_c*S_{val})t + \frac{a_m}{f_m}\sin(2\pi f_m t)\right)$$

Vary $a_m$ as a function of the sensor:

$$a_{pm} = a_c \sin\left(2\pi f_c t + \frac{a_m*S_{val}}{f_m}\sin(2\pi f_m t)\right)$$

Vary $f_m$ as a function of the sensor:

$$a_{pm} = a_c \sin\left(2\pi f_c t + \frac{a_m}{f_m}\sin(2\pi f_m*S_{val}t)\right)$$

Vary $a_c$ as a function of the sensor:

$$a_{pm} = a_c*S_{val} \sin\left(2\pi f_c t + \frac{a_m}{f_m}\sin(2\pi f_m t)\right)$$

Frequency Modulation

One embodiment uses FM by modifying the phase modulation of Equation 4 by a one-time factor that multiplies the phase of the equation:

$$a_{fm}=a_c \sin(2\pi f_c t + a_m \sin(2\pi f_m t)t) \quad \text{Equation 5}$$

Equation 5 in general varies in the time domain (t) only. However the terms $a_c$, $f_c$, $a_m$, and $f_m$ can vary as a function of some external signal generated by a sensor (e.g. acceleration, magnetic field, pressure) as was disclosed above in conjunction with the phase modulation embodiment.

Figure 4:
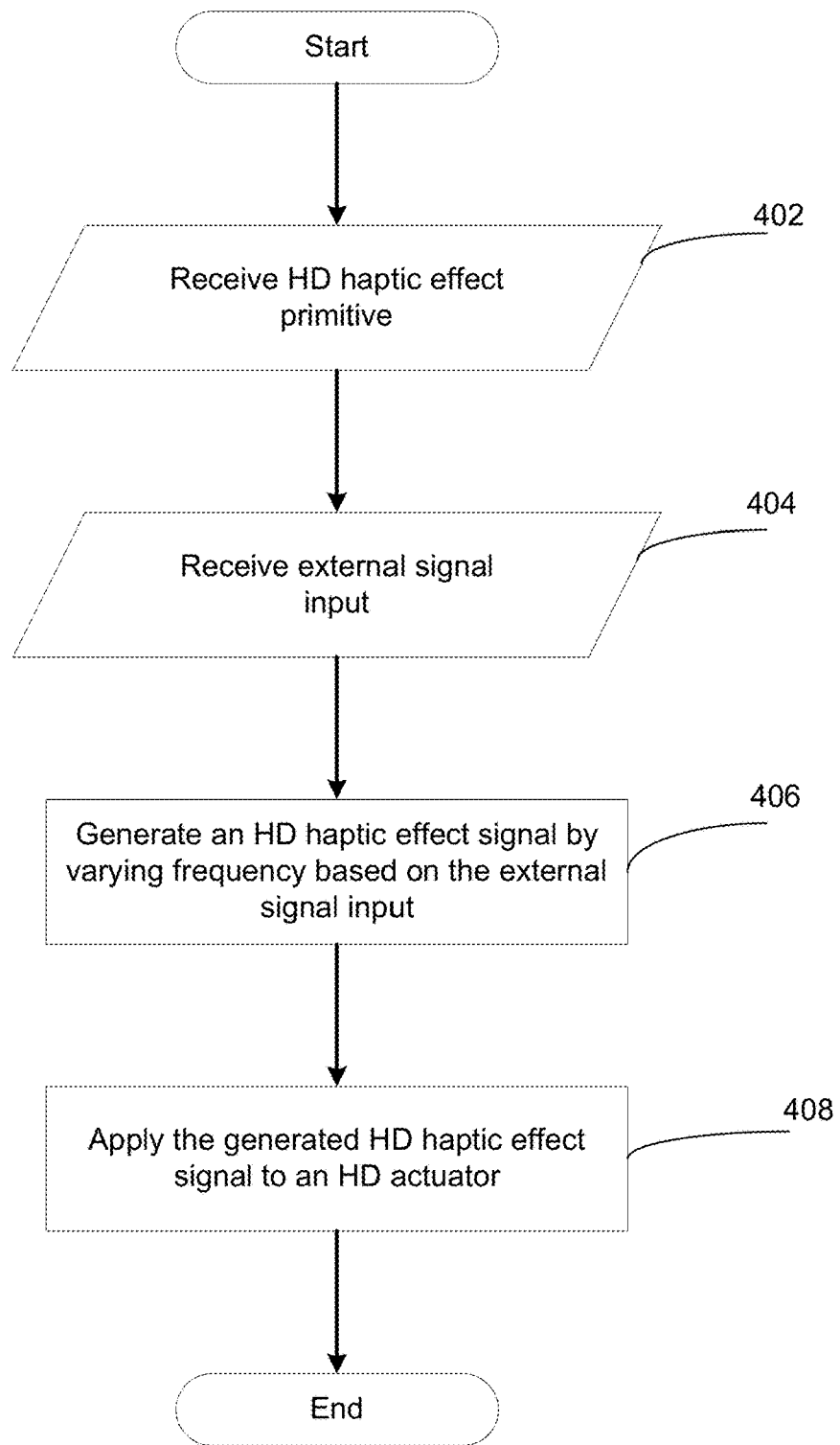
FIG. 4 is a flow diagram of the functionality of a high definition ("HD") haptic effect generation module of FIG. 1 when generating HD haptic effect signals from HD haptic effect primitives in accordance with one embodiment.

FIG. 4 is a flow diagram of the functionality of HD haptic effect generation module 22 of FIG. 1 when generating HD haptic effect signals from HD haptic effect primitives in accordance with one embodiment. In one embodiment, the functionality of the flow diagram of FIG. 4, and FIG. 6 below, is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 402, the HD haptic effect primitive is received. The HD effect primitive is expressed in the form of high level input parameters.

At 404, input from a sensor such as an accelerometer or from any type of external signal is received.

At 406, the HD haptic effect signal is generated from the HD haptic effect primitive received at 402. The generation of the signal includes varying a frequency of the signal based on the sensor input at 404. The frequency can be varied as disclosed above, including frequency variation, frequency modulation, scaling, and phase modulation.

At 408, the generated HD haptic effect signal is applied to the HD actuator 18, which generates a vibratory haptic effect on system 10. The generated output haptic effect signal includes a plurality of output parameters such as frequency.

PhISEM Based HD Haptic Effects Generation

One embodiment generates HD haptic effect signals from HD haptic primitives by modifying the content of HD haptic effect signal based on a corresponding input sensor signal, such as an acceleration signal generated by an accelerometer of system 10, using a stochastic process. The modification is to the magnitude of the signal, but the frequency or other parameters can also be modified. The stochastic process used by this embodiment is Physically Inspired Stochastic Event Modeling ("PhISEM"). PhISEM is a known algorithm, disclosed in P. Cook et al., "*Using DSP-Based Parametric Physical Synthesis Models to Study Human Sound Perception*" (2003) ("Cook") and has been used in digital signal processing to synthesize sounds of some percussion instruments that create sounds naturally based on random particle systems.

Figure 5:
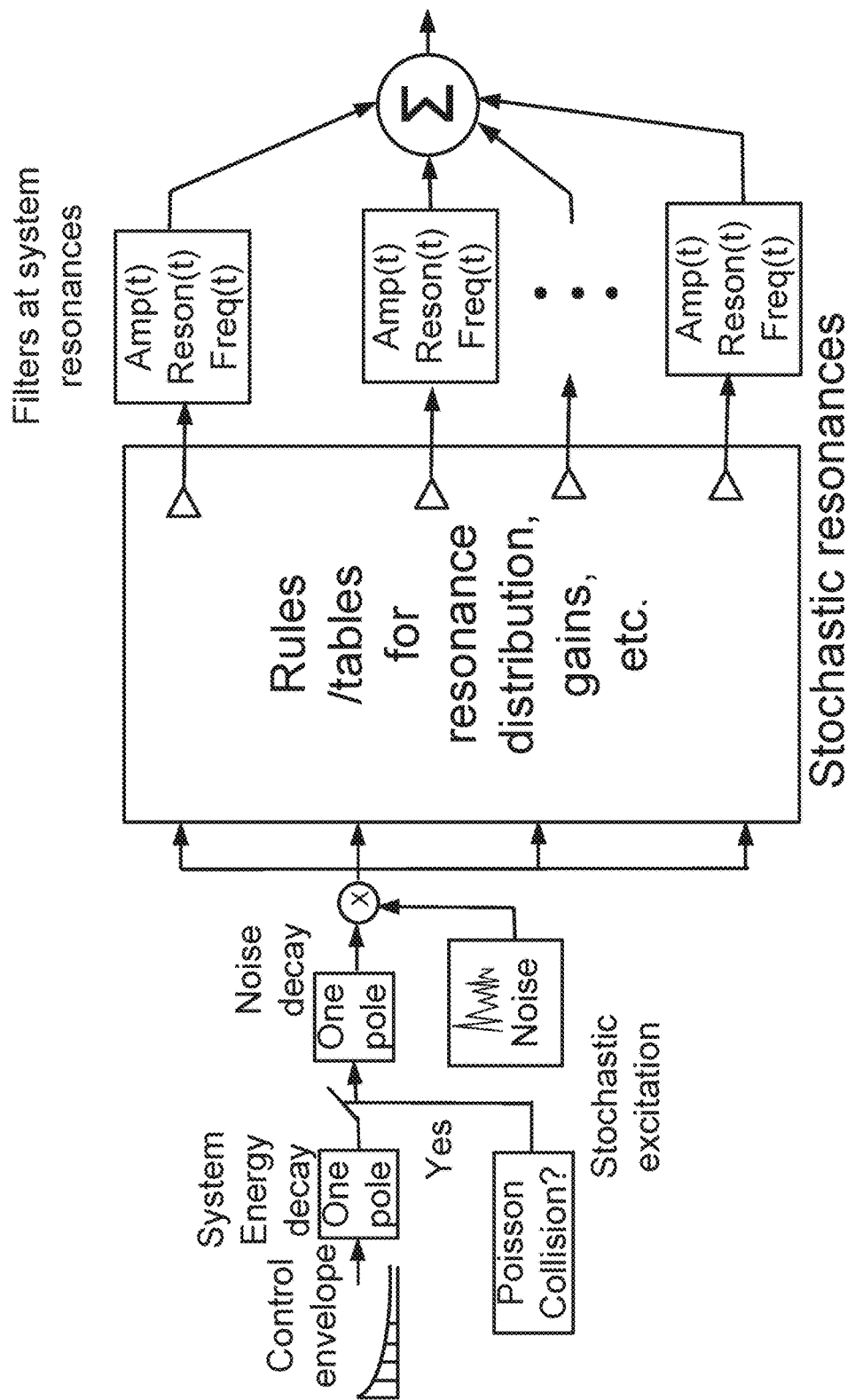
FIG. 5 is a block diagram representation of a Physically Inspired Stochastic Event Modeling algorithm.

FIG. 5 is a block diagram representation of the PhISEM algorithm as disclosed in Cook. The PhISEM algorithm was derived from a dynamic system simulation of different particles colliding with each other with each particle having an energy and damping. The PhISEM algorithm captures the behavior of the dynamic model to a statistical model with the parameters in the model related directly to the parameters used in the simulation of the dynamic model.

Embodiments of the present invention modify and adapt the PhISEM algorithm for use with generating HD haptic effect signals from HD haptic effect primitives. Embodiments synthesize the haptic signal and the range of frequencies used in the resonant filters. For example, the synthesis of a sound requires values above 1 KHz, at least for percussion type instruments such as a maraca. In one embodiment, for a haptic implementation the filters have resonances around 200 Hz or less. In other embodiments, this number can be up to 4000 Hz. The number of filters used in embodiments could be as low as one, but more can be used.

In one embodiment, the following pseudo-code is implemented by HD haptic effect generation module 22 to generate an HD haptic effect signal from an HD haptic effect primitive:

```
#define VIBE_DECAY 0.95
#define SYSTEM_DECAY 0.999
shakeEnergy = getEnergy( );              // energy envelope
shakeEnergy *= SYSTEM_DECAY;             // exponential system decay
                                         // EACH SAMPLE:
if (random(1024) < num_beans) {          // If collision
    vibeLevel += gain * shakeEnergy      // add energy to haptic effect
}
input = vibeLevel * noise_tick( );       // Vibe is random
vibeLevel *= VIBE_DECAY;                 // Exponential sound decay
filterOut = filterSignal(filterCoef, input);  // Filter signal to produce final
                                         // output
```

In the implementation above:

"getEnergy( )" retrieves the value of the energy into the system from an external sensor or other signal. The energy can be a sensor signal such as an accelerometer, a virtual sensor, a periodic signal, etc.

The "SYSTEM_DECAY" parameter can take values between 0 and 1 and is the "system energy decay" parameter of FIG. 5.

"num_beans" is the number of elements colliding in the percussion instrument. Changing this parameter changes the synthesis of the haptic effect. In an alternative embodiment, this parameter can change as a function of an external signal (sensor, data extraction/processing, periodic signal, etc.)

"gain" is a pre-computed value that levels up the overall magnitude of the signal.

"noise_tick( )" is a function that generates the random nature of the vibration.

The "VIBE DECAY" parameter can take values between 0 and 1 and is the "control envelope" parameter of FIG. 5.

"filterSignal( )" filters the random signal using the filter(s) specified by "filterCoef". In one embodiment, resonant filters with resonant frequencies between 10 Hz and 4000 Hz can used, and only one filter can be used.

Figure 6:
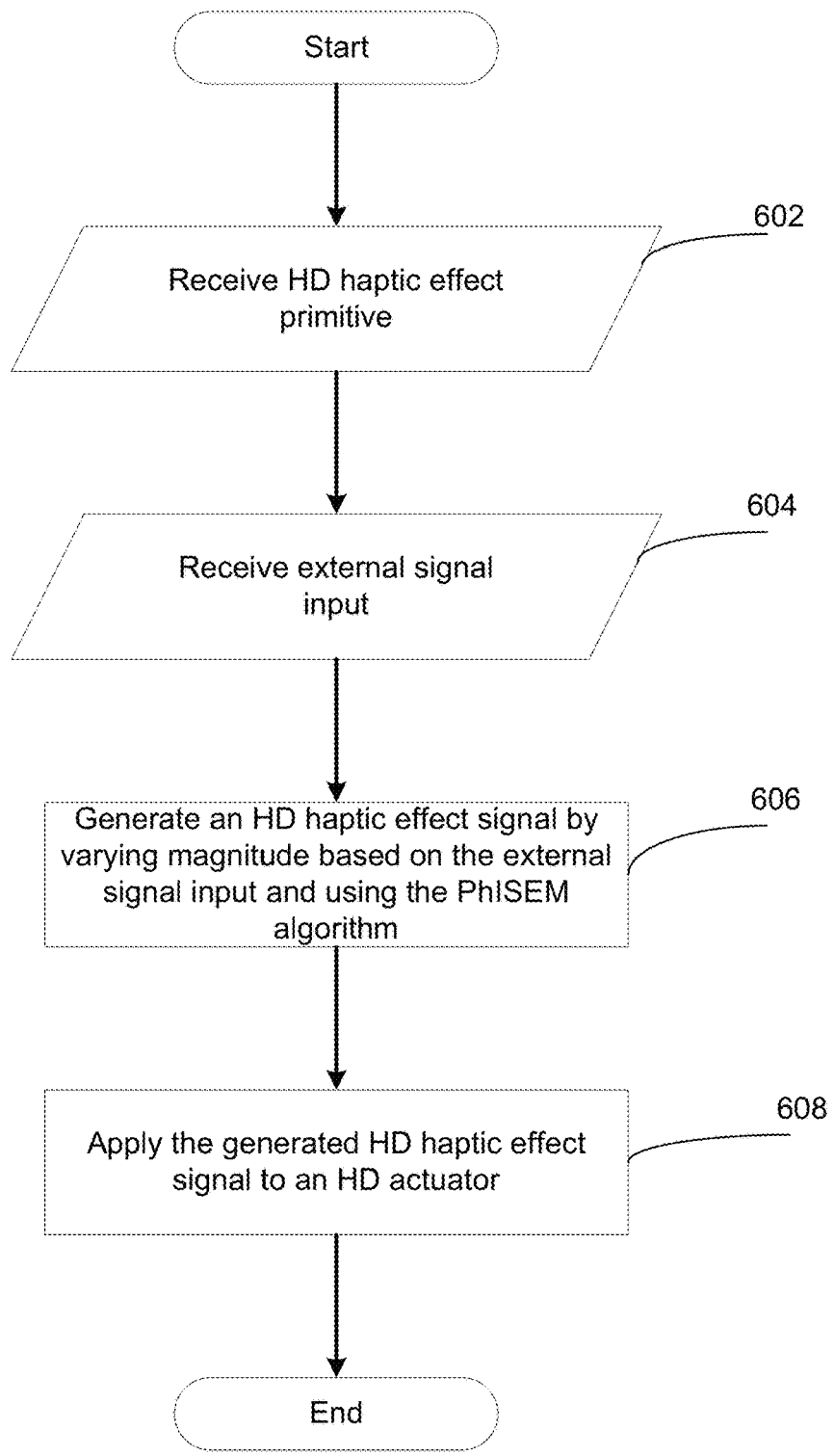
FIG. 6 is a flow diagram of the functionality of the HD haptic effect generation module of FIG. 1 when generating HD haptic effect signals from HD haptic effect primitives in accordance with one embodiment.

FIG. 6 is a flow diagram of the functionality of HD haptic effect generation module 22 of FIG. 1 when generating HD haptic effect signals from HD haptic effect primitives in accordance with one embodiment.

At 602, the HD haptic effect primitive is received. The HD effect primitive is expressed in the form of high level input parameters.

At 604, input from a sensor such as an accelerometer or from any type of external signal is received.

At 606, the HD haptic effect signal is generated from the HD haptic effect primitive received at 602. The generation of the signal includes varying a magnitude of the signal based on the sensor input at 604 in accordance with PhISEM algorithm.

At 608, the generated HD haptic effect signal is applied to the HD actuator 18, which generates a vibratory haptic effect on system 10. The generated HD haptic effect signal includes a plurality of output parameters As disclosed, HD haptic effects are generated by receiving an HD haptic effect primitive and using an external sensor signal to vary a parameter of a generated HD haptic effect output signal. The varied parameter may be the frequency in one embodiment, or the magnitude using the PhISEM algorithm in another embodiment.

In one embodiment, in addition to using the frequency based algorithms or the PhISEM algorithm to generate HD haptic effects, the same general algorithms, are adapted/modified to generate audio as described above. System 10 can then generate sounds and HD haptic effects in substantially exact synchronization. In this embodiment, to generate sound and haptics, an external input signal, such as finger velocity or acceleration can be fed into the respective algorithms and consistent sound and haptics will be generated.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of generating haptic effects on a device, the method comprising:
   receiving a haptic effect primitive comprising a plurality of predefined haptic parameters that define a haptic effect;
   receiving an input, from a sensor, that varies over a time duration;
   generating a dynamic haptic effect signal, based on the haptic effect primitive and the input, including:
      generating, based on the plurality of predefined haptic parameters, a plurality of output haptic parameters including an amplitude of the dynamic haptic effect signal, and
      varying the amplitude of the dynamic haptic effect signal continuously over the time duration using phase modulation, the amplitude of the dynamic haptic effect signal being a function of at least a carrier signal amplitude ($a_c$), a modulation signal amplitude ($a_m$), a carrier signal frequency ($f_c$) and a modulation signal frequency ($f_m$); and
   applying the dynamic haptic effect signal to an actuator to generate the haptic effect.

2. The method of claim 1, wherein the plurality of predefined haptic parameters include the carrier signal amplitude ($a_c$), the modulation signal amplitude ($a_m$), the carrier signal frequency ($f_c$) and the modulation signal frequency ($f_m$).

3. The method of claim 1, wherein the sensor comprises an accelerometer and the input corresponds to a movement of the device.

4. The method of claim 1, wherein the device comprises a touchscreen and the input is based on a position of an object on the touchscreen or a pressure of the object on the touchscreen.

5. The method of claim 1, wherein the amplitude of the dynamic haptic effect signal ($a_{pm}$) comprises:

$$a_{pm} = a_c \sin\left(2\pi f_c t + \frac{a_m}{f_m}\sin(2\pi f_m t)\right).$$

6. The method of claim 1, wherein the amplitude ($a_{pm}$) of the dynamic haptic effect signal is a function of the input ($S_{val}$) and comprises one of:

$$a_{pm} = a_c \sin\left(2\pi (f_c * S_{val})t + \frac{a_m}{f_m}\sin(2\pi f_m t)\right),$$

$$a_{pm} = a_c \sin\left(2\pi f_c t + \frac{a_m * S_{val}}{f_m}\sin(2\pi f_m t)\right),$$

$$a_{pm} = a_c \sin\left(2\pi f_c t + \frac{a_m}{f_m}\sin(2\pi f_m * S_{val}t)\right), \text{ or}$$

$$a_{pm} = a_c * S_{val} \sin\left(2\pi f_c t + \frac{a_m}{f_m}\sin(2\pi f_m t)\right).$$

7. The method of claim 1, wherein the amplitude of the dynamic haptic effect signal is varied using a Physically Inspired Stochastic Event Modeling algorithm.

8. A haptically enabled system comprising:
an actuator;
a sensor; and
a processor, coupled to the actuator and the sensor, configured to:
receive a haptic effect primitive comprising a plurality of predefined haptic parameters that define a haptic effect,
receive an input, from the sensor, that varies over a time duration;
generate a dynamic haptic effect signal, based on the haptic effect primitive and the input, including:
generate, based on the plurality of predefined haptic parameters, a plurality of output haptic parameters including an amplitude of the dynamic haptic effect signal, and
vary the amplitude of the dynamic haptic effect signal continuously over the time duration using phase modulation, the amplitude of the dynamic haptic effect signal being a function of at least a carrier signal amplitude ($a_c$), a modulation signal amplitude ($a_m$), a carrier signal frequency ($f_c$) and a modulation signal frequency ($f_m$), and
apply the dynamic haptic effect signal to the actuator to generate the haptic effect.

9. The system of claim 8, wherein the plurality of predefined haptic parameters include the carrier signal amplitude ($a_c$), the modulation signal amplitude ($a_m$), the carrier signal ($f_c$) and the modulation signal frequency ($f_m$).

10. The system of claim 8, wherein the sensor comprises an accelerometer and the input corresponds to a movement of the system.

11. The system of claim 8, further comprising a touchscreen coupled to the processor, wherein the input is based on a position of an object on the touchscreen or a pressure of the object on the touchscreen.

12. The system of claim 8, wherein the amplitude ($a_{pm}$) of the dynamic haptic effect signal comprises:

$$a_{pm} = a_c \sin\left(2\pi f_c t + \frac{a_m}{f_m}\sin(2\pi f_m t)\right).$$

13. The system of claim 8, wherein the amplitude ($a_{pm}$) of the dynamic haptic effect signal is a function of the input ($S_{val}$) and comprises one of:

$$a_{pm} = a_c \sin\left(2\pi (f_c * S_{val})t + \frac{a_m}{f_m}\sin(2\pi f_m t)\right),$$

$$a_{pm} = a_c \sin\left(2\pi f_c t + \frac{a_m * S_{val}}{f_m}\sin(2\pi f_m t)\right),$$

$$a_{pm} = a_c \sin\left(2\pi f_c t + \frac{a_m}{f_m}\sin(2\pi f_m * S_{val}t)\right), \text{ or}$$

$$a_{pm} = a_c * S_{val} \sin\left(2\pi f_c t + \frac{a_m}{f_m}\sin(2\pi f_m t)\right).$$

14. The system of claim 8, wherein the amplitude of the dynamic haptic effect signal is varied using a Physically Inspired Stochastic Event Modeling algorithm.

15. The system of claim 8, wherein the actuator comprises one of a piezo actuator, an electroactive polymer actuator, or an electro-static actuator.

16. A non-transitory computer-readable medium having instructions stored thereon that, when executed by a processor, cause the processor to generate haptic effects on a device, the instructions comprising:
receiving a haptic effect primitive comprising a plurality of predefined haptic parameters that define a haptic effect;
receiving an input, from a sensor, that varies over a time duration;
generating a dynamic haptic effect signal, based on the haptic effect primitive and the input, including:
generating, based on the plurality of predefined haptic parameters, a plurality of output haptic parameters including an amplitude of the dynamic haptic effect signal, and
varying the amplitude of the dynamic haptic effect signal continuously over the time duration using phase modulation, the amplitude of the dynamic haptic effect signal being a function of at least a carrier signal amplitude ($a_c$), a modulation signal amplitude ($a_m$), a carrier signal frequency ($f_c$) and a modulation signal frequency ($f_m$); and
applying the dynamic haptic effect signal to an actuator to generate the haptic effect.

17. The non-transitory computer-readable medium of claim 16, wherein the plurality of predefined haptic parameters include the carrier signal amplitude ($a_c$), the modulation signal amplitude ($a_m$), the carrier signal frequency ($f_c$) and the modulation signal frequency ($f_m$).

18. The non-transitory computer-readable medium of claim 16, wherein the device comprises an accelerometer and a touchscreen, and the input corresponds to a movement of the device based on the accelerometer or the input is based on a position of an object on the touchscreen or a pressure of the object on the touchscreen.

19. The non-transitory computer-readable medium of claim 16, wherein the amplitude ($a_{pm}$) of the dynamic haptic effect signal comprises:

$$a_{pm} = a_c \sin\left(2\pi f_c t + \frac{a_m}{f_m}\sin(2\pi f_m t)\right).$$

20. The non-transitory computer-readable medium of claim 16, wherein the amplitude ($a_{pm}$) of the dynamic haptic effect signal is a function of the input ($S_{val}$) and comprises one of:

$$a_{pm} = a_c \sin\left(2\pi(f_c * S_{val})t + \frac{a_m}{f_m}\sin(2\pi f_m t)\right),$$

$$a_{pm} = a_c \sin\left(2\pi f_c t + \frac{a_m * S_{val}}{f_m}\sin(2\pi f_m t)\right),$$

$$a_{pm} = a_c \sin\left(2\pi f_c t + \frac{a_m}{f_m}\sin(2\pi f_m * S_{val} t)\right), \text{ or}$$

$$a_{pm} = a_c * S_{val} \sin\left(2\pi f_c t + \frac{a_m}{f_m}\sin(2\pi f_m t)\right).$$

* * * * *